United States Patent [19]

Mueller-Tamm et al.

[11] 4,037,042
[45] July 19, 1977

[54] MANUFACTURE OF OLEFIN POLYMERS

[75] Inventors: Heinz Mueller-Tamm, Ludwigshafen; Hans Frielingsdorf, Bad Duerkheim; Leonhard Gonsior, Ludwigshafen; Wolfgang Gruber, Frankenthal, all of Germany

[73] Assignee: BASF Aktiengesellschaft, Ludwigshafen, Germany

[21] Appl. No.: 720,249

[22] Filed: Sept. 2, 1976

[30] Foreign Application Priority Data

Sept. 10, 1975 Germany .............................. 2540278

[51] Int. Cl.$^2$ .......................... C08F 4/02; C08F 4/24; C08F 10/00; C08F 10/02
[52] U.S. Cl. .................................. 526/106; 423/338; 423/339; 526/352
[58] Field of Search ................. 526/106; 423/338, 339

[56] References Cited

U.S. PATENT DOCUMENTS

| | | | |
|---|---|---|---|
| 3,862,104 | 1/1975 | Witt ..................................... | 526/106 |
| 3,870,656 | 3/1975 | Brown et al. ......................... | 526/106 |
| 3,900,457 | 8/1975 | Witt ..................................... | 526/106 |
| 3,960,826 | 6/1976 | Aboutboul et al. ................... | 526/106 |

OTHER PUBLICATIONS

Chem. Abstracts, 77, 166765t (1972).

*Primary Examiner*—Alan Holler
*Attorney, Agent, or Firm*—Keil, Thompson & Shurtleff

[57] ABSTRACT

A process for the manufacture of olefin polymers by polymerization of α-monoolefins by means of a silicic acid xerogel/chromium trioxide catalyst, which is obtained by a method wherein (1) a finely divided silicic acid xerogel is first manufactured by (1.1) employing a silicic acid hydrogel of relatively high solids content, (1.2) extracting at least 60% of the water contained in the hydrogel from the latter by means of a particular organic liquid, (1.3) drying the gel thus obtained until there is no further loss in weight (xerogel formation) and (1.4) reducing the xerogel thus obtained to particles of diameter from 20 to 2,000 μm, 2. this xerogel is then charged with the desired amount of chromium from a solution of chromium trioxide or a solution of a chromium compound which under the conditions of stage (3) is converted to chromium trioxide, with evaporation of the solvent, and
3. finally the product thus obtained is heated in an anhydrous stream of gas containing oxygen. The process according to the invention is charaterized in that a catalyst is employed which is manufactured under such conditions that in stage (1) the starting material is a silicic acid hydrogel (1.1) which is substantially spherical, has a particle diameter of from 1 to 8 mm and is obtained by A. introducing a solution of sodium waterglass or potassium waterglass both longitudinally and tangentially into a vortical stream of an aqueous inorganic acid,
B. spraying droplets of the resulting silicic acid hydrosol into a gaseous medium,
C. allowing the sprayed hydrosol to solidify to a hydrogel in the gaseous medium and
D. freeing the resulting substantially spherical hydrogel from salts by washing, without prior aging. The catalyst gives polymers having good processability.

7 Claims, No Drawings

MANUFACTURE OF OLEFIN POLYMERS

Several variants of such processes are known, but in each case the silicic acid xerogel/chromium trioxide catalyst employed is of a particular kind.

The modifications in the process of manufacture of the catalysts are made in order to achieve certain objectives, eg. to obtain the following:

a. catalysts which are capable of giving an improved yield of polymer, ie.

$a_1$. catalysts with increased productivity, ie. systems in which the amount of polymer formed per unit weight of catalyst is increased, or $a_2$. catalysts with increased activity, ie. systems in which the amount of polymer formed per unit weight of catalyst and per unit time is increased;

b. catalysts which display their positive effect even at relatively low temperatures, which may be of importance, for example, for solid phase polymerizations;

c. catalysts which influence the morphological properties of the polymer in certain ways, eg. which give a uniform particle size and/or a high bulk density, which can be of importance, for example, for control of the polymerization systems in industrial operation, for working up of the polymers and/or for (good) processability of the polymers;

d. catalysts which make it possible to obtain polymers of relatively low molecular weight, ie. polymers with a relatively high melt index (equivalent to better processability), even in the absence of molecular weight regulators, such as hydrogen; and e. catalysts which are designed for special polymerization processes, for example those which are designed either for the specific features of suspension polymerization or the specific features of solid phase polymerization.

Experience to date has shown that amongst the numerous objectives there are some which can only be achieved, by modifications made during the manufacture of the catalysts, if other objectives are set back.

Thus it has hitherto been necessary, when manufacturing olefin polymers of good processability, ie. polymers of low melt viscosity, to work at relatively extremely high polymerization temperatures and/or in the presence of relatively very large amounts of hydrogen as a molecular weight regulator. Examples of severe disadvantages which result therefrom are the formation of crusts of polymer on the reactor surface, the formation of dust-like polymer and/or the low productivity of the catalyst which in turn may make it necessary subsequently to remove relatively large amounts of catalyst constituents from the polymer in an additional process step.

It is an object, inter alia, of the present invention to provide a catalytic process by means of which it is possible to manufacture easily processable olefin polymers, whilst avoiding or greatly reducing the above disadvantages.

We have found that this object is achieved by employing, within the process defined at the outset, a catalyst in which the silicic acid hydrogel which serves as the starting material for the manufacture of the catalyst is substantially spherical and has been manufactured in a particular manner.

Accordingly, the present invention relates to a process for the manufacture of olefin polymers by polymerization of α-monoolefins of 2 to 8 carbon atoms at from 60° to 160° C and at olefin pressures of from 0.5 to 40 bars by means of a silicic acid xerogel/chromium trioxide catalyst, which is obtained when 1. a finely divided silicic acid xerogel is first manufactured by 1.1. employing a silicic acid hydrogel containing from 10 to 25, preferably from 12 to 20 and especially from 14 to 20, percent by weight of solids (calculated as silicon dioxide), 1.2. extracting at least 60%, and especially at least 90%, of the water contained in the hydrogel, from the latter by means of an organic liquid selected from the alkanols of 1 to 4 carbon atoms and the alkanones of 3 to 5 carbon atoms, 1.3. drying the resulting dehydrated gel until there is no further loss in weight in the course of 30 minutes at 180° C under 10 mm Hg (xerogel formation) and 1.4. reducing the resulting xerogel to particles having a diameter of from 20 to 2,000μm, especially of from 40 to 300μm, 2. this xerogel is then charged with chromium from a solution, of from 0.05 to 5 percent strength by weight, of chromium trioxide in an alkanone of 3 to 5 carbon atoms or from a solution, of from 0.05 to 15 percent strength by weight, of a chromium compound which under the conditions of stage (3) is converted to chromium trioxide, in an alkanol of 1 to 4 carbon atoms - the solvent in each case not containing more than 20 percent by weight of water and preferably mot more than 5 percent by weight of water - whilst evaporating the solvent, and 3. the resulting product is finally kept at from 400° to 1,100° C for from 10 to 1,000 minutes in an anhydrous stream of gas containing oxygen in a concentration of more than 10 percent by volume.

The process according to the invention is characterized in that a catalyst is employed which is manufactured under such conditions that in stage (1) the starting material is a silicic acid hydrogel (1.1) which is substantially spherical, has a particle diameter of from 1 to 8, especially from 2 to 6, mm and is obtained by A. introducing a solution of sodium waterglass or potassium waterglass both longitudinally and tangentially into a vortical stream of an aqueous inorganic acid, B. spraying droplets of the resulting silicic acid hydrosol in a gaseous medium, C. allowing the sprayed hydrosol to solidify to a hydrogel in the gaseous medium and D. freeing the resulting substantially spherical hydrogel from salts by washing, without prior aging.

The following details should be noted with regard to the manufacture of the catalyst to be employed in the process according to the invention:

1. FIRST STAGE 1.1. The factor which is characteristic of this stage and is to a large degree the decisive factor in the success of the process according to the invention is that a silicic acid hydrogel is employed which has a relatively high solids content, is substantially spherical and, especially, has been manufactured in a particular manner.

Sub-stages (A) to (C) of this particular method of manufacture have been disclosed. Reference may be made to German Laid-Open application No. 2,103,243, especially page 3 thereof, last paragraph, to page 7, third paragraph, and Example 1 (equivalent to U.S. Pat. application, Ser. No. 220,142 Series of 1970, Gerhard Merz et al, Filing Date Jan. 24, 1972, especially page 3, last paragraph, to page 7, second paragraph, and Example 1). The matter presented there and falling under the definitions given in the characterizing clause of the present invention are hereby incorporated, by reference, in the disclosure of the present application.

The sub-stage (D), ie. the washing of the hydrogel, in itself entails no unusual feature; it can, for example, advantageously be carried out by counter-current with slightly ammoniacal (pH up to about 10) water which is at up to 80° C.

1.2. The extraction of the water from the silicic acid hydrogel by means of the organic liquid defined above may be carried out in conventional extraction equipment. Column extractors are an example of suitable equipment. Organic liquids which have proved suitable are the following alkanols (listed in decreasing effectiveness but not in decreasing economy): tert.-butanol, i-propanol, ethanol and methanol. Amongst the alkanones - which, overall, are preferred to the alkanols, acetone, above all, has proved suitable. Obviously the organic liquid can consist of one or more of the possible compounds, but in every case the liquid should, before the extraction process, contain less than 5 percent by weight of water and preferably less than 3 percent by weight of water.

1.3. The conversion of the gel, treated with the organic liquid, into the xerogel (ie. the drying) can again be carried out in drying equipment conventionally used for such purposes. The best results are obtained if the drying is carried out at product temperatures of from 30° to 140° C and at pressures of from 1 to 760 mm Hg; because of the vapor pressure, an increasing temperature should also be balanced by an increasing pressure and vice versa. The drying process can be accelerated - especially at relatively high pressures - by using a stream of an entraining gas, eg. nitrogen.

1.4. The method of obtained xerogel particles of a particular diameter in itself entails no unusual feature. It can, for example, be carried out in a simple manner, by milling the product obtained from stage (1.3) and fractionating the milled product by sieving.

2. SECOND STAGE

An advantageous method of charging the xerogel with the chromium component is to suspend the xerogel in a solution of chromium trioxide or of a chromium compound which is converted to chromium trioxide under the conditions of stage (3) and evaporate off the volatile constituents of the batch, ie. alkanone and/or alkanol and water, if any, whilst mixing the the batch continuously and as homogeneously as possible. It is most advantageous to carry out this treatment at from 20° to 150° C and at pressures of from 10 to 760 mm Hg. Whether or not the xerogel charged with the chromium component still contains some residual moisture is not critical (provided the volatile constituents do not amount to more than 20, and especially not more than 10, percent by weight, based on the xerogel). Suitable chromium components in this particular context are above all chromium trioxide and chromium hydroxide, as well as soluble salts of trivalent chromium with an organic or inorganic acid, eg. the acetate, oxalate, sulfate and nitrate; salts of such acids which on activation are entirely converted to chromium (VI) are particularly suitable. Chromium compounds in the form of chelates, eg. chromium acetylacetonate, can also be employed.

3. THIRD STAGE

This stage serves to activate the catalyst; it can be carried out in the conventional manner for this purpose, ie. in particular under conditions which ensure that in the finished catalyst the chromium is at least partially present in the hexavalent state. Appropriate procedures are disclosed, eg., in German Laid-Open application No. 1,520,467, page 3, line 11, to page 4, line 3.

It should further be noted that the unusual feature of the process according to the invention essentially resides in the new catalyst employed.

Allowing for this feature, the process can in other respects be carried out in virtually all the relevant conventional technological embodiments, eg. as a batchwise, cyclic or continuous process, wich may be, for example, a suspension polymerization process, solution polymerization process or solid phase polymerization process, though it offers the greatest advantages in the first-mentioned and last-mentioned case. The technological embodiments mentioned, ie. the technological variants of the Phillips process for the polymerization of olefins, are well-known from the literature (cf., for example, German Pat. No. 1,051,004 and the further developments thereof which have been disclosed) and from industrial practice, so that more detailed comments thereon are superfluous.

However, it should be mentioned that the new process is suitable for the homopolymerization and copolymerization of olefins, eg. $\alpha$-monoolefins of 2 to 8 carbon atoms; it is particularly suitable for the manufacture of homopolymers of ethylene. In the case of the manufacture of copolymers of ethylene with $\alpha$-monoolefins or the manufacture of homopolymers of $\alpha$-monoolefins, suitable $\alpha$-monoolefins are above all propene, but-1-lene, 4-methylpent-1-ene, hex-1-ene and oct-1-ene. The use of hydrogen as a molecular weight regulator is generally not necessary in the process of the invention, though, if desired, relatively very small amounts of such regulators can be used.

Finally, it should be noted that in the polymerization of olefins using the process according to the invention, a substantial additional advantage is achievable because the catalyst to be employed can be obtained in forms which have a particularly high productivity. In that case, the proportion of catalyst in the polymer is so small that it does not interfere and its removal - which would require a separate process step - is generally unnecessary.

EXAMPLE

Manufacture of the silicic acid xerogel

A mixing nozzle as shown in the drawing of German Laid-Open application No. 2,103,243 (equivalent to U.S. Pat. application Ser. No. 220,142), and having the following data, is used: the diameter of the cylindrical mixing chamber, which consists of a plastic tube, is 14 mm, whilst the length of the mixing space (including the postmixing zone) is 350 mm. A tangential inlet orifice of 4 mm diameter for the mineral acid is provided near the entry side of the mixing chamber, which side is closed at its end face. This orifice is followed by four further orifices, again of 4 mm diameter and having the same inlet direction, for the waterglass solution, the spacing of the orifices being 30 mm, measured in the lengthwise direction of the mixing chamber. Accordingly, the ratio of length to diameter of the primary mixing zone is about 10. For the subsequent secondary mixing zone, this ratio is about 15. A slightly kidney-shaped, pressed flat, length of tube is pushed over the outlet end of the plastic tube, to act as a discharge nozzle.

This mixing device is charged with 325 l/hour of 33 percent strength by weight sulfuric acid at 20° C under an operating pressure of about 2 atmospheres gauge, and with 1,100 l/hour of a waterglass solution (manufactured from technical-grade waterglass, containing 27% by weight of $SiO_2$ and 8% by weight of $Na_2O$, by dilution with water, which weighs 1.20 kg/l, is also at 20° C and is also under a pressure of about 2 atmospheres gauge. An unstable hydrosol having a pH of from 7 to 8 is formed in the mixing chamber, lined with the plastic tube, by progressive neutralization, and this hydrosol additionally remains for about 0.1 second - until completely homogenized -in the post-mixing zone, before it is sprayed, through the nozzle, as a fan-shaped liquid jet into the atmosphere. Whilst travelling through the air, the jet breaks up into individual drops, which, because of surface tension, assume a substantially spherical shape and solidify in the course of about one second, ie. whilst still travelling through the air, to hydrogel spheres. The spheres have a smooth surface, are glass-clear, contain about 17% by weight of $SiO_2$ and have the following particle size distribution:

| | |
|---|---|
| > 8 mm | 10% by weight |
| 6 - 8 mm | 45% by weight |
| 4 - 6 mm | 34% by weight |
| < 4 mm | 11% by weight |

(The particle size distribution can be varied as desired by using different nozzles.)

At the end of their travel through the air, the hydrogel spheres are collected in a washing tower which is almost completely filled with hydrogel spheres, and in which the spheres are washed salt-free immediately, ie. without aging, by means of slightly ammoniacal water at about 50° C, in a continuous counter-current process.

The spheres, which have a diameter of from 2 to 6 mm, are isolated by sieving and 112 kg of the spheres are charged into an extraction vat having an inlet at the top, a perforated bottom and a swan-neck overflow which is connected to the underside of the vat and keeps the liquid in the vat at a level such that it completely covers the hydrogel spheres. Ethanol is then allowed to run in at a rate of 60 l/hour until the density of the ethanol/water mixture issuing from the overflow has fallen to 0.826 g/cm³; at that stage, about 95% of the water contained in the hydrogel has been extracted.

The spheres thus obtained are dried (12 hours at 120° C under 15 mm Hg) until there is no further loss of weight in the course of 30 minutes at 180° C under 10 mm Hg.

The dried spheres are then milled and the xerogel particles, which have diameters of from 40 to 300μm, are then isolated by sieving.

MANUFACTURE OF THE CATALYST 15 kg of the xerogel described above and 40 liters of a 4.1 percent strength by weight solution of chromium-III nitrate nonahydrate are charged into a twin-cone mixer. The ethanol is then distilled off under reduced pressure from a waterpump whilst the mixer, which is externally steam-heated at 130° C, is rotating.

The resulting product is heated for 6 hours at 900° C in a fluidized bed through which air flows, and is then cooled again. From 150° C downwards, nitrogen flows through the fluidized bed to remove traces of oxygen (which interfere with the polymerization).

POLYMERIZATION

A reactor conventionally employed for the continuous polymerization of ethylene, the reaction chamber of which consists of a tubular loop of 20 m³ capacity, is used. The reaction chamber is filled with a 40 percent strength by weight suspension of polyethylene in isobutene, which is circulated by means of an axial-flow pump at a sufficient rate to cause turbulent flow. A temperature of 105° C is maintained in the reactor.

In the course of the continuous polymerization, 120 g/hour of the catalyst are introduced, and an ethylene partial pressure of 10 bars is maintained.

1,535 kg/hour of grit-like polyethylene are produced and discharged from the reactor. The polyethylene has an HLMI of 60 g/10 mins (measured according to ASTM D 1238) and an ash content of about 80 ppm.

COMPARATIVE EXPERIMENT

The manufacture of the catalyst, and the polymerization, are carried out in identically the same manner as in the above Example except that a commercially available xerogel, intended for the manufacture of catalysts for the polymerization of olefins, is used as a starting material for the manufacture of the catalyst.

In this case. a polyethylene which has an HLMI of 35 g/10 mins (measured according to ASTM D 1238) and an ash content of 270 ppm is obtained.

What we claim is:
1. A process for the manufacture of an olefin polymer by polymerization of one or more α-monoolefins of 2 to 8 carbon atoms at from 60° to 160° C and at an olefin pressure of from 0.5 to 40 bars, by means of a silicic acid xerogel/chromium trioxide catalyst which is obtained when
   1. a finely divided silicic acid xerogel is first manufactured by
      (1.1) employing a silicic acid hydrogel containing from 10 to 25 percent by weight of solids (calculated as silicon dioxide),
      (1.2) extracting at least 60% of the water contained in the hydrogel from the latter by means of an organic liquid selected from the alkanols of 1 to 4 carbon atoms and the alkanones of 3 to 5 carbon atoms,
      (1.3) drying the resulting dehydrated gel until there is no further loss in weight in the course of 30 minutes at 180° C under 10 mm Hg and
      (1.4) reducing the resulting xerogel to particles having a diameter of from 20 to 2,000 μm,
   2. this xerogel is then charged with chromium from a solution, of from 0.05 to 5 percent strength by weight, of chromium trioxide in an alkanone of 3 to 5 carbon atoms or from a solution, of from 0.05 to 15 percent strength by weight, of a chromium compound which under the conditions of stage (3) is converted to chromium trioxide, in an alkanol of 1 to 4 carbon atoms - the solvent in each case not containing more than 20 percent by weight of water - whilst evaporating the solvent, and
   3. the resulting product is finally kept at from 400° to 1,100° C for from 10 to 1,000 minutes in an anhydrous stream of gas containing oxygen in a concentration of more than 10 percent by volume, in which process a catalyst is employed which is manufactured under such conditions that in stage (1) the starting material is a silicic acid hydrogel (1.1) which is substantially spherical, has a particle diameter of from 1 to 8 mm and is obtained by A. introducing a solution of sodium waterglass or potassium waterglass both longitudinally and tangentially into a vortical stream of an aqueous inorganic acid, B. spraying droplets of the resulting silicic acid hydrosol into a gaseous medium, C. allowing the sprayed hydrosol to solidify to a hydrogel in the gaseous medium and D. freeing the resulting substantially spherical hydrogel from salts by washing, without prior aging.

2. A process as claimed in claim 1 wherein the silicic acid hydrogel contains from 14 to 20 percent by weight of solids calculated as silicon dioxide.

3. A process as claimed in claim 1 wherein the silicic acid hydrogel has a particle diameter of 2 to 6 mm.

4. A process as claimed in claim 1 wherein at least 90% by weight of the water contained in the hydrogel is extracted therefrom.

5. A process as claimed in claim 1 wherein acetone is employed as the extracting material in step (1.2).

6. A process as claimed in claim 1 wherein the xerogel is reduced to particles having a diameter of from 40 to 300 μm.

7. A process as claimed in claim 1 wherein the solvent for the chromium trioxide or chromium compound in stage (2) contains not more than 5 percent by weight of water.

* * * * *